(12) United States Patent
Swartz et al.

(10) Patent No.: US 9,562,499 B2
(45) Date of Patent: Feb. 7, 2017

(54) PURGE VALVE DETACHMENT DIAGNOSTIC SYSTEMS AND METHODS

(71) Applicant: GM Global Technology Operations LLC, Detroit, MI (US)

(72) Inventors: Kenneth C. Swartz, Commerce Township, MI (US); Miles K. Maxey, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

(21) Appl. No.: 14/539,187

(22) Filed: Nov. 12, 2014

(65) Prior Publication Data

US 2016/0061154 A1  Mar. 3, 2016

Related U.S. Application Data

(60) Provisional application No. 62/043,724, filed on Aug. 29, 2014.

(51) Int. Cl.
*F02M 25/08* (2006.01)
*F02D 41/00* (2006.01)
*F02D 41/22* (2006.01)

(52) U.S. Cl.
CPC ........ *F02M 25/0818* (2013.01); *F02D 41/003* (2013.01); *F02D 41/004* (2013.01);
(Continued)

(58) Field of Classification Search
CPC  F02M 25/08; F02M 28/0809; F02M 28/0819; F02M 25/0836; F02M 25/0854; F02D 41/00; F02D 41/003
See application file for complete search history.

(56) References Cited

U.S. PATENT DOCUMENTS 5,474,050 A * 12/1995 Cook ................. F02M 25/0809
123/198 D
5,669,362 A * 9/1997 Shinohara .......... F02M 25/0809
123/520

(Continued)

FOREIGN PATENT DOCUMENTS

DE  102010012913 A1  9/2011
DE  102011104424 A1  12/2012
JP  2013-185528 A  9/2013

OTHER PUBLICATIONS

U.S. Appl. No. 14/539,108, filed Nov. 12, 2014, Jeffrey.
U.S. Appl. No. 14/539,308, filed Nov. 12, 2014, Jeffrey.

*Primary Examiner* — Hieu T Vo (57) ABSTRACT

A diagnostic system for a vehicle includes a purge valve control module that closes a purge valve. The purge valve regulates fuel vapor flow from a fuel vapor canister to an intake system of an engine. A pump control module, after the closing of the purge valve, turns on a pump that pumps fuel vapor toward the purge valve. A first pressure module, after the purge valve is closed, determines a first pressure measured using a pressure sensor located between the pump and the purge valve. A second pressure module, after the determination of the first pressure and while the pump is on, determines a second pressure measured using the pressure sensor located between the pump and the purge valve. A diagnostic module selectively diagnoses detachment of the purge valve from the intake system based on the first and second pressures.

20 Claims, 9 Drawing Sheets

(52) U.S. Cl.
CPC ........... *F02D 41/22* (2013.01); *F02D 41/221* (2013.01); *F02M 25/0836* (2013.01); *F02D 2041/225* (2013.01); *F02D 2200/0602* (2013.01)

(56) References Cited

U.S. PATENT DOCUMENTS

| | | | |
|---|---|---|---|
| 6,276,343 B1 * | 8/2001 | Kawamura | ........ F02M 25/0809 123/516 |
| 6,499,476 B1 | 12/2002 | Reddy | |
| 8,122,758 B2 * | 2/2012 | Wang | ................ F02M 25/0809 73/40 |
| 2015/0013437 A1 | 1/2015 | Takakura | |

* cited by examiner

PURGE VALVE DETACHMENT DIAGNOSTIC SYSTEMS AND METHODS

CROSS-REFERENCE TO RELATED APPLICATIONS

This application claims the benefit of U.S. Provisional Application No. 62/043,724, filed on Aug. 29, 2014. The entire disclosure of the application referenced above is incorporated herein by reference.

This application is related to U.S. patent application Ser. No. 14/539,108, which is filed on the same day as this application and claims the benefit of U.S. Provisional Application No. 62/043,741 filed on Aug. 29, 2014; and Ser. No. 14/539,308 filed on the same day as this application. The entire disclosures of the above applications are incorporated herein by reference.

FIELD

The present disclosure relates to internal combustion engines and more particularly to systems and methods for diagnosing detachment of a purge valve from an air intake system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. The fuel may be a combination of liquid fuel and vapor fuel. A fuel system supplies liquid fuel and vapor fuel to the engine. A fuel injector provides the engine with liquid fuel drawn from a fuel tank. A vapor purge system provides the engine with fuel vapor drawn from a vapor canister.

Liquid fuel is stored within the fuel tank. In some circumstances, the liquid fuel may vaporize and form fuel vapor. The vapor canister traps and stores the fuel vapor. The purge system includes a purge valve. Operation of the engine causes a vacuum (low pressure relative to atmospheric pressure) to form within an intake manifold of the engine. The vacuum within the intake manifold and selective actuation of the purge valve allows the fuel vapor to be drawn into the intake manifold and purge the fuel vapor from the vapor canister.

SUMMARY

In a feature, a diagnostic system for a vehicle is disclosed. A purge valve control module closes a purge valve that regulates fuel vapor flow from a fuel vapor canister to an intake system of an engine. A pump control module, after the closing of the purge valve, turns on a pump that pumps fuel vapor toward the purge valve. A first pressure module, after the purge valve is closed, determines a first pressure measured using a pressure sensor located between the pump and the purge valve. A second pressure module, after the determination of the first pressure and while the pump is on, determines a second pressure measured using the pressure sensor located between the pump and the purge valve. A diagnostic module selectively diagnoses detachment of the purge valve from the intake system based on the first and second pressures.

In further features, a difference module determines a pressure difference based on the second pressure minus the first pressure. The diagnostic module diagnoses the detachment of the purge valve when the pressure difference is less than a predetermined pressure.

In further features, the diagnostic module diagnoses attachment of the purge valve with the intake system when the pressure difference is greater than the predetermined pressure.

In further features, the purge valve includes: an input port that for receiving output from the pump; and two output ports for sealingly engaging two input ports of the intake system, respectively.

In further features, one of the two input ports of the intake system is closed to prevent flow from the purge valve into the intake system through the one of the two input ports.

In further features, the diagnostic module sets a predetermined diagnostic trouble code (DTC) in memory when the purge valve is detached from the intake system.

In further features, a monitoring module selectively illuminates a malfunction indicator lamp when the purge valve is detached from the intake system.

In further features, the second pressure module determines the second pressure a predetermined period after the determination of the first pressure.

In further features, the second pressure module determines the second pressure a predetermined period after the turning on of the pump.

In further features, the first pressure module determines the first pressure one of before and after the turning on of the pump.

In a feature, a method is disclosed. The method includes: closing a purge valve that regulates fuel vapor flow from a fuel vapor canister to an intake system of an engine; after the closing of the purge valve, turning on a pump that pumps fuel vapor toward the purge valve; after the purge valve is closed, determining a first pressure measured using a pressure sensor located between the pump and the purge valve; after the determination of the first pressure and while the pump is on, determining a second pressure measured using the pressure sensor located between the pump and the purge valve; and selectively diagnosing detachment of the purge valve from the intake system based on the first and second pressures.

In further feature, the method further includes: determining a pressure difference based on the second pressure minus the first pressure; and diagnosing the detachment of the purge valve when the pressure difference is less than a predetermined pressure.

In further feature, the method further includes diagnosing attachment of the purge valve with the intake system when the pressure difference is greater than the predetermined pressure.

In further feature, the purge valve includes: an input port that for receiving output from the pump; and two output ports for sealingly engaging two input ports of the intake system, respectively.

In further feature, one of the two input ports of the intake system is closed to prevent flow from the purge valve into the intake system through the one of the two input ports.

In further feature, the method further includes setting a predetermined diagnostic trouble code (DTC) in memory when the purge valve is detached from the intake system.

In further feature, the method further includes selectively illuminating a malfunction indicator lamp when the purge valve is detached from the intake system.

In further feature, the method further includes determining the second pressure a predetermined period after the determination of the first pressure.

In further feature, the method further includes determining the second pressure a predetermined period after the turning on of the pump.

In further feature, the method further includes determining the first pressure one of before and after the turning on of the pump.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A fuel system includes a vapor canister that traps and stores fuel vapor. A purge valve is selectively opened to purge the fuel vapor from the vapor canister to an internal combustion engine. In some types of engines, such as naturally aspirated engines, vacuum within an intake manifold may be used to draw fuel vapor through the purge valve. Other types of engines, such as boosted engines, may have insufficient vacuum or boost to draw fuel vapor through the purge valve. A pump may be used to pump fuel vapor from the vapor canister to an intake system of engines having insufficient boost or vacuum. Some purge valves may be directly coupled to a component of an intake system of an engine.

A control module selectively closes a purge valve and activates a pump to determine whether the purge valve is detached from an intake system of an engine. Closing the purge valve prevents fuel vapor flow into the intake system. However, fuel vapor may exit the purge valve when the purge valve is detached from the intake system. The control module therefore determines whether the purge valve is detached based on whether a pressure measured at a location between the pump and the purge valve increases over time when the purge valve is closed and the pump is on.

Figure 1:
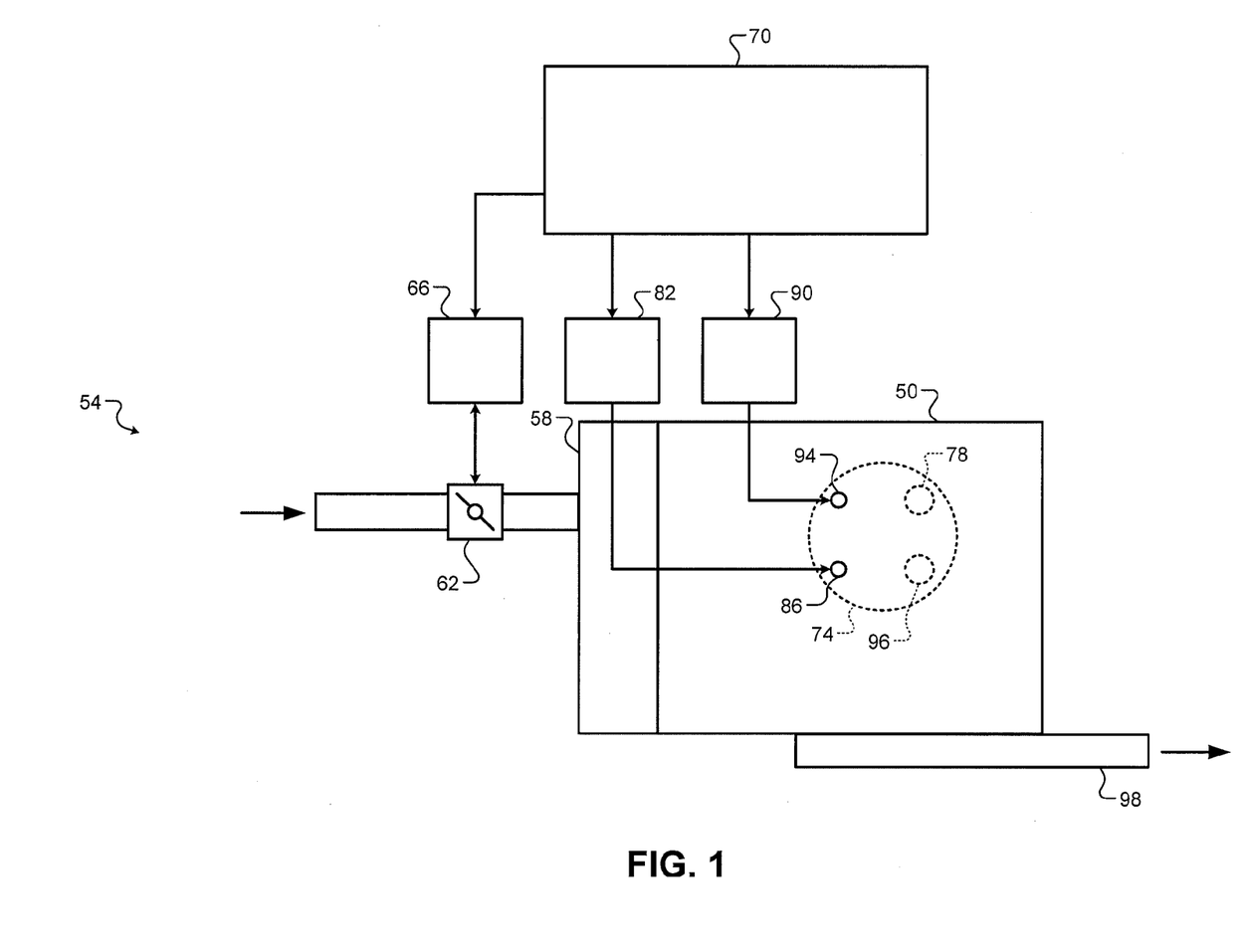
FIG. 1 is a functional block diagram of an example direct injection engine system.

Referring now to FIG. 1, a functional block diagram of an example engine system for a vehicle is presented. An engine 50 combusts an air/fuel mixture to produce drive torque for a vehicle. While the engine 50 will be discussed as a spark ignition direct injection (SIDI) engine, the engine 50 may include another type of engine. One or more electric motors and/or motor generator units (MGUs) may be provided with the engine 50.

Air flows into the engine 50 via an intake system 54. More specifically, air flows into an intake manifold 58 through a throttle valve 62. The throttle valve 62 may vary airflow into the intake manifold 58. For example only, the throttle valve 62 may include a butterfly valve having a rotatable blade. A throttle actuator module 66 (e.g., an electronic throttle controller or ETC) controls opening of the throttle valve 62 based on signals from an engine control module (ECM) 70. In various implementations, the intake system 54 includes one or more boost devices, such as one or more superchargers and/or one or more turbochargers, that increase airflow into the intake manifold 58 and, therefore, the engine 50.

Air from the intake manifold 58 is drawn into cylinders of the engine 50. While the engine 50 may include more than one cylinder, only a single representative cylinder 74 is shown. Air from the intake manifold 58 is drawn into the cylinder 74 through one or more intake valves of the cylinder 74, such an intake valve 78. One or more intake valves may be provided with each cylinder.

A fuel actuator module 82 controls fuel injectors of the engine 50, such as fuel injector 86, based on signals from the ECM 70. A fuel injector may be provided for each cylinder. The fuel injectors inject fuel, such as gasoline, for combustion within the cylinders. The ECM 70 may control fuel injection to achieve a target air/fuel ratio, such as a stoichiometric air/fuel ratio.

The injected fuel mixes with air and creates an air/fuel mixture in the cylinder 74. Based upon a signal from the ECM 70, a spark actuator module 90 may energize a spark plug 94 in the cylinder 74. A spark plug may be provided for each cylinder. Some types of engines, such as diesel engines, do not include spark plugs. Spark generated by the spark plug 94 ignites the air/fuel mixture. Exhaust resulting from combustion is expelled from the cylinder 74 via one or more exhaust valves, such as exhaust valve 96, to an exhaust system 98. One or more exhaust valves may be provided for each cylinder.

Figure 2A:
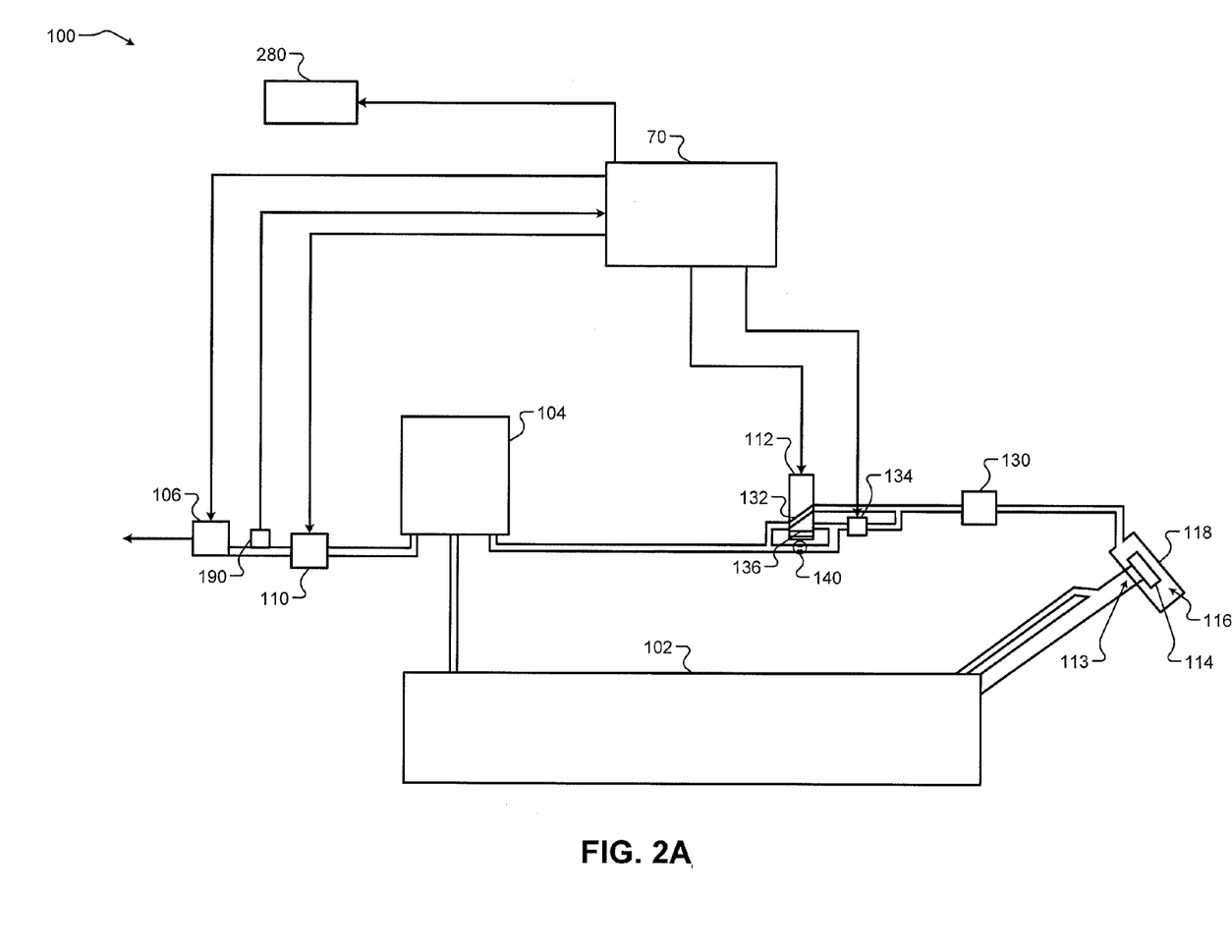
FIGS. 2A and 2B include example fuel systems and control systems.

Referring now to FIG. 2A, a functional block diagram of an example fuel system 100 is presented. The fuel system 100 supplies fuel to the engine 50. More specifically, the fuel system 100 supplies both liquid fuel and fuel vapor to the engine 50. The fuel system 100 includes a fuel tank 102 that contains liquid fuel. Liquid fuel is drawn from the fuel tank 102 and supplied to the fuel injectors of the engine 50 by one or more fuel pumps (not shown).

Some conditions, such as refueling, heat, vibration, and/or radiation, may cause liquid fuel within the fuel tank 102 to vaporize. A vapor canister 104 traps and stores vaporized fuel (fuel vapor). The vapor canister 104 may include one or more substances that trap and store fuel vapor, such as a charcoal.

Figure 3:
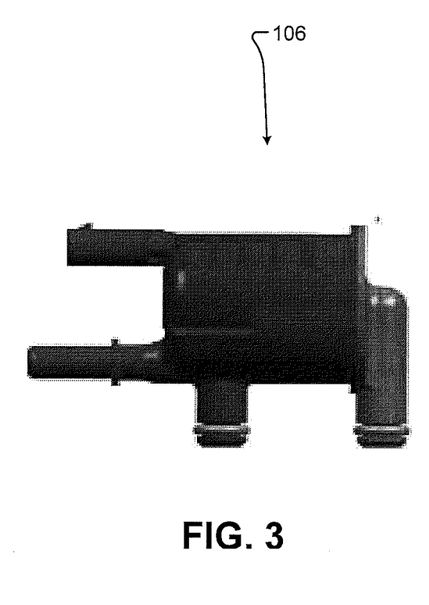
FIG. 3 is an example illustration of a purge valve.

A purge valve 106 opens and closes to enable and disable, respectively, fuel vapor flow to the engine 50. An example illustration of the purge valve 106 is provided in FIG. 3. Operation of the engine 50 may create a vacuum relative to ambient pressure within the intake manifold 58.

In some instances, such as when one or more boost devices are increasing airflow into the engine 50, pressure within the intake manifold 58 may be greater than or approximately equal to ambient pressure. A pump 110 may be implemented that pumps fuel vapor from the vapor canister 104 to the purge valve 106. When the purge valve 106 is open, the pump 110 also pumps fuel vapor from the vapor canister 104 toward the engine 50.

The ECM 70 controls the purge valve 106 and the pump 110 to control the flow of fuel vapor to the engine 50. The ECM 70 may also control a switching valve 112. When the switching valve 112 is in a vent position, the ECM 70 may selectively open the purge valve 106 and turn on the pump 110 to purge fuel vapor from the vapor canister 104 to the intake system 54.

The ECM 70 may control the rate at which fuel vapor is purged from the vapor canister 104 (a purge rate) by controlling opening and closing of the purge valve 106. For example only, the ECM 70 may control the purge rate, the purge valve 106 may include a solenoid valve, and the ECM 70 may control the purge rate by controlling duty cycle of a signal applied to the purge valve 106. Ambient air flows into the vapor canister 104 as fuel vapor flows from the vapor canister 104 toward the intake system 54.

A driver of the vehicle may add liquid fuel to the fuel tank 102 via a fuel inlet 113. A fuel cap 114 seals the fuel inlet 113. The fuel cap 114 and the fuel inlet 113 may be accessed via a fueling compartment 116. A fuel door 118 may be implemented to shield and close the fueling compartment 116.

The ambient air provided to the vapor canister 104 through the switching valve 112 may be drawn from the fueling compartment 116. A filter 130 receives the ambient air and filters various particulate from the ambient air.

The switching valve 112 may be actuated to the vent position or to a pump position. The switching valve 112 is shown as being in the vent position in the example of FIG. 2A. When the switching valve 112 is in the vent position, air can flow from the filter 130 to the vapor canister 104 via a first path 132 through the switching valve 112. When the switching valve 112 is in the pump position, air can flow between a vacuum pump 134 and the vapor canister 104 via a second path 136 through the switching valve 112.

When the vacuum pump 134 is on while the switching valve 112 is in the pump position, the vacuum pump 134 may draw gasses (e.g., air) through the switching valve 112 and expel the gasses through the filter 130. The vacuum pump 134 may draw the gasses through the second path 136 and a reference orifice 140. A relief valve (not shown) may be implemented to selectively discharge pressure or vacuum within the fuel system 100. The vacuum pump 134 may be operated, for example, to determine whether one or more leaks are present in the fuel system.

Figure 2B:
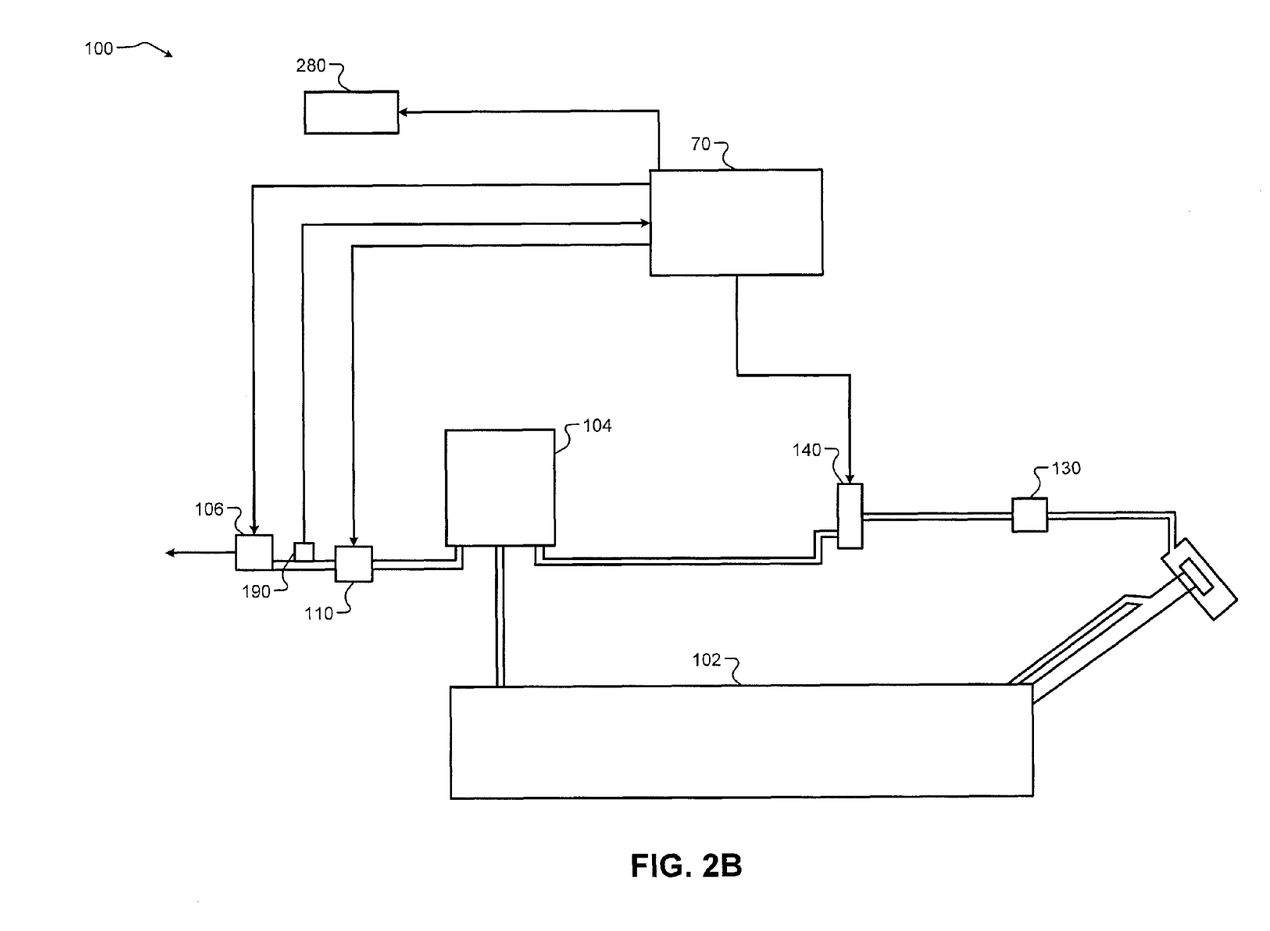

FIG. 2B includes a fuel system where ambient air flows into the vapor canister 104 through a vent valve 140 and the filter 130. The ECM 70 controls opening and closing of the vent valve 140.

The purge valve 106 is directly coupled to a component of the intake system 54, such as the intake manifold 58 or an intake pipe through which air flows into the intake manifold 58. In in engines having a boost device, the purge valve 106 may be directly coupled to a component upstream of the boost device.

Figure 4A:
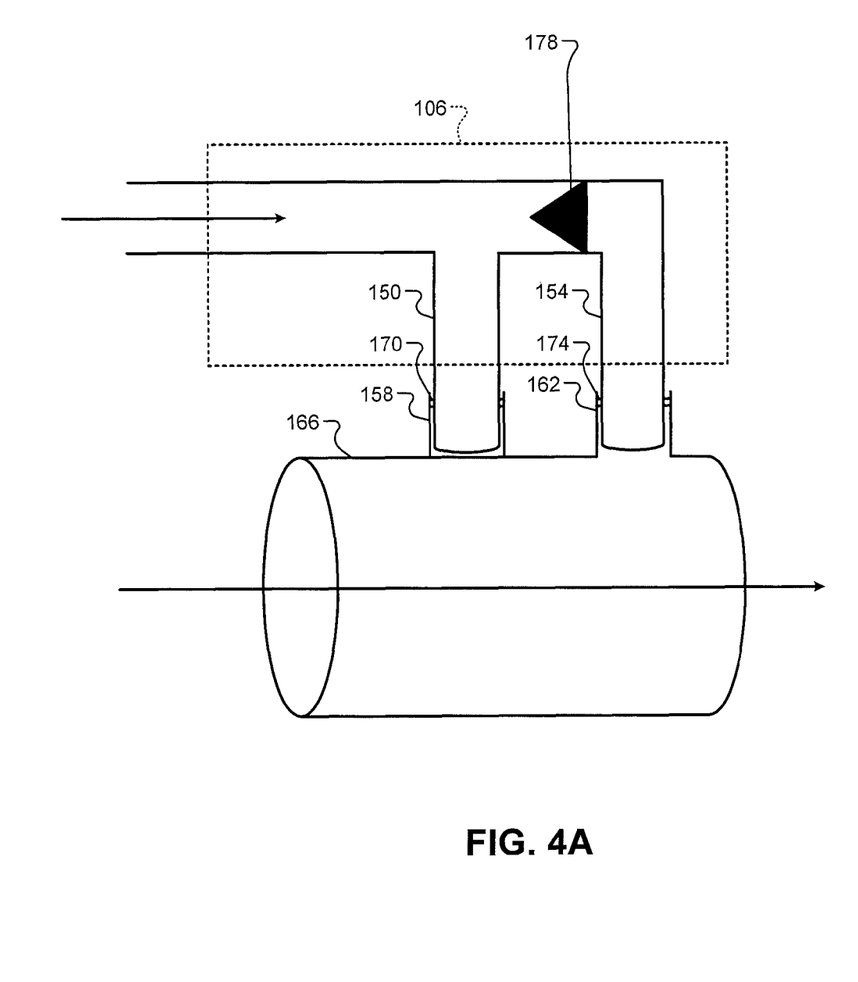
FIG. 4A is an example illustration of a purge valve that is attached to a component of an air intake system.

FIG. 4A includes an example illustration of the purge valve 106 having multiple outlets 150 and 154 coupled to ports 158 and 162 of a component 166 of the intake system 54. As described above, the component 166 may be, for example, the intake manifold 58, an intake pipe through which air flows into the intake manifold 58, or another suitable component of the intake system 54. In the case of a boost, the component 166 may be upstream of a component that increases airflow into the engine 50 (e.g., upstream of a compressor of a turbocharger). O-rings 170 and 174 may be provided to seal the outlets 150 and 154 and the ports 158 and 162.

One of the ports of the component 166 is closed such that fuel vapor through that port into the air stream is blocked. In the example of FIG. 4A, port 158 is shown as being closed. Thus, fuel vapor flow from outlet 150 through port 158 and into the air stream is blocked, even when the purge valve 106 is attached to the component 166. While the example of the purge valve 106 including two outlets coupled to two ports of the component of the intake system 54, the present disclosure is also applicable to a greater number of outlets and ports.

A valve member 178 regulates fuel vapor flow through the outlet 154. Fuel vapor output from the outlet 154 flows into the component 166 and into the air stream for combustion within the engine 50 when the purge valve 106 is attached to the component 166. As the port 158 is blocked, fuel vapor flow through the outlet 150 of the purge valve 106 is also blocked when the purge valve 106 is attached to the component 166 of the intake system 54.

The ECM 70 controls opening and closing of the valve member 178 to control the flow of fuel vapor into the component 166 of the intake system 54. For example only, as described above, the ECM 70 may control a duty cycle of a signal applied to the valve member 178 to control the opening and closing of the valve member 178.

Figure 4B:
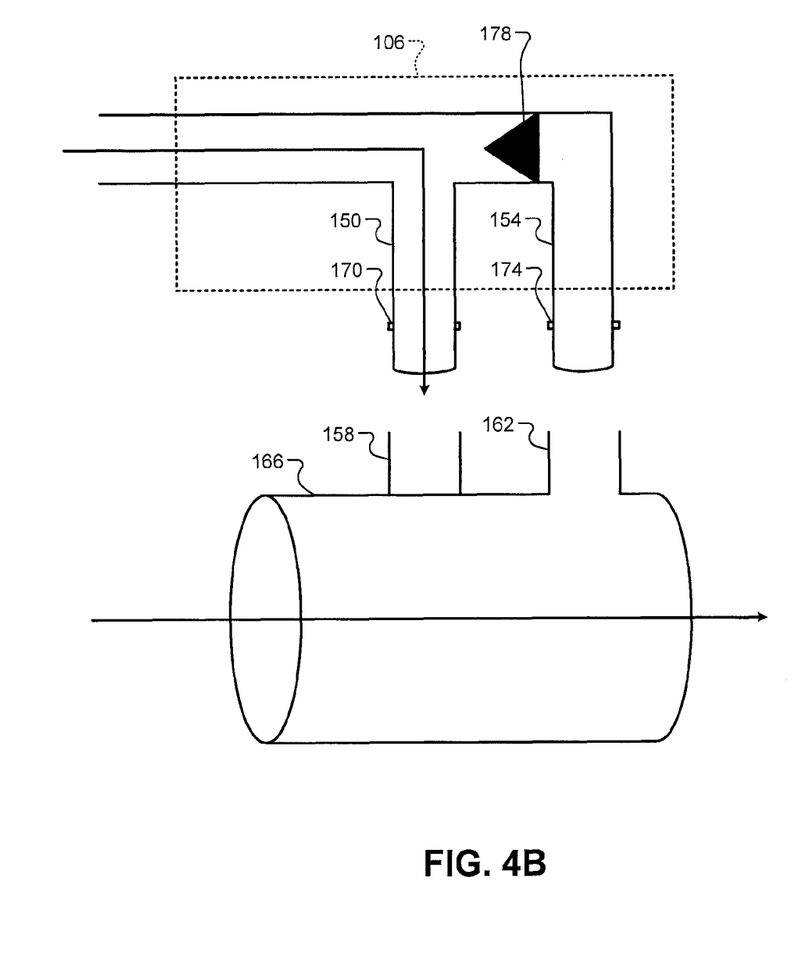
FIG. 4B is an example illustration of a purge valve that is detached from the component of the air intake system.

A pressure sensor 190 measures a pressure at a location between the pump 110 and the purge valve 106. Based on the pressure measured using the pressure sensor 190, the ECM 70 diagnoses whether the purge valve 106 is detached from the component 166 of the intake system 54. When the purge valve 106 is detached from the component 166 of the intake system, fuel vapor can flow through the outlet 150. When the valve member 178 is closed and the pump 110 is on, a failure of the pressure measured by the pressure sensor 190 to increase may therefore indicate that the purge valve 106 is detached from the component 166 of the intake system 54. FIG. 4B includes an example illustration of the disconnection of the purge valve from the component 166. While the ECM 70 will be discussed as diagnosing detachment of the purge valve 106 from the component 166, the diagnosis may be performed by another suitable module of a vehicle.

Figure 5:
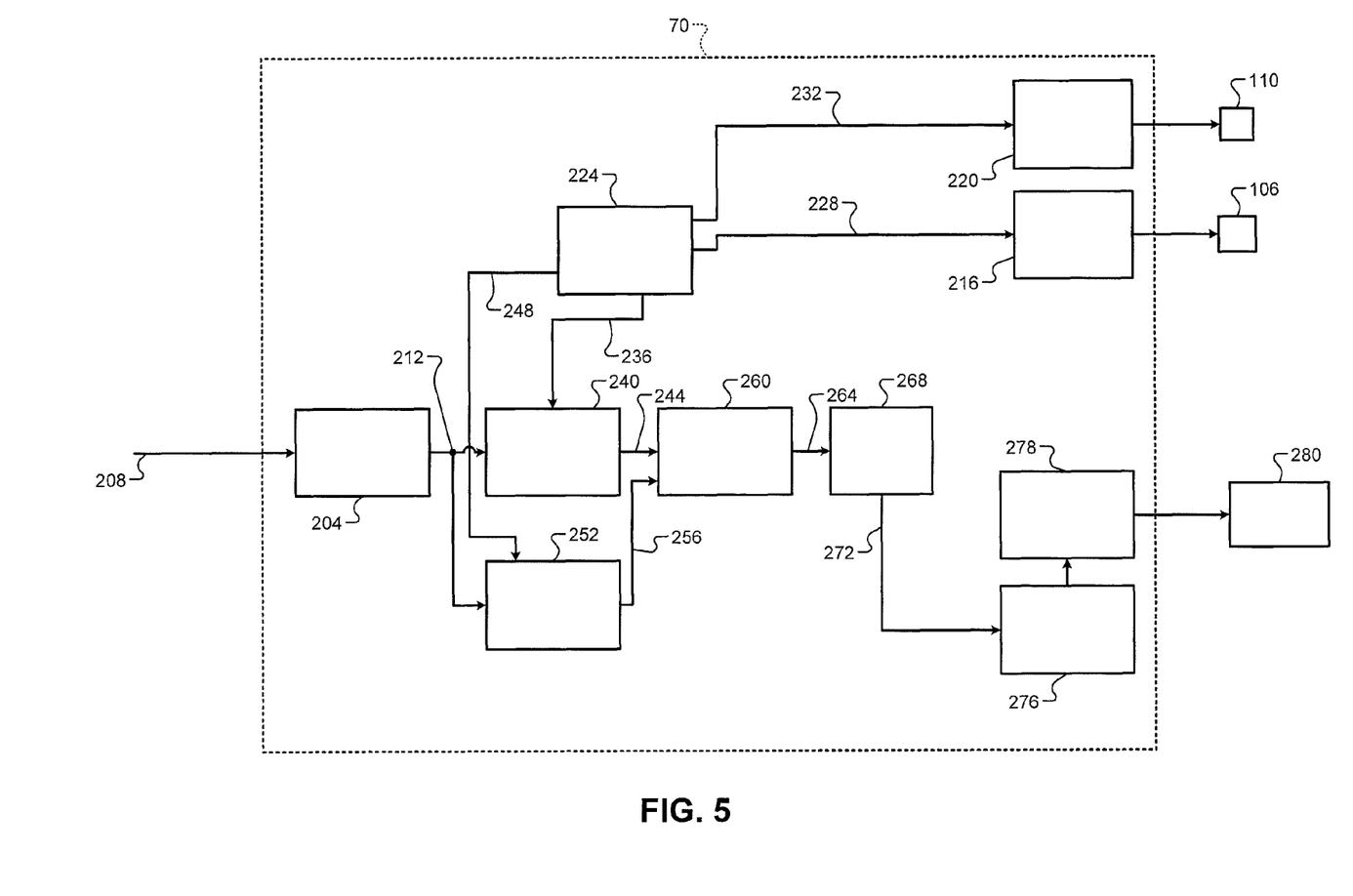
FIG. 5 is a functional block diagram of an example portion of an engine control module.

FIG. 5 is a functional block diagram of an example portion of the ECM 70. A sampling module 204 receives the pressure signal 208 from the pressure sensor 190. The sampling module 204 samples the pressure signal 208 and outputs pressure samples 212. The sampling module 204 may also buffer, digitize, filter, and/or perform one or more other functions to produce the pressure samples 212.

A purge valve control module 216 controls the purge valve 106. A pump control module 220 controls the pump 110. A triggering module 224 triggers performance of various functions for the diagnosis of whether the purge valve 106 is detached from the component 166 of the intake system 54.

For example, the triggering module 224 generates a first trigger signal 228. In response to the first trigger signal 228, the purge valve control module 216 closes the purge valve 106 to fully closed. In this manner, fuel vapor flow through the outlet 154 and port 162 is blocked.

After generating the first trigger signal 228, the triggering module 224 generates a second trigger signal 232. The triggering module 224 may generate the second trigger signal 232, for example, a first predetermined period after generating the first trigger signal 228. In response to the second trigger signal 232, the pump control module 220 turns the pump 110 on.

If the purge valve 106 is attached to the intake system 54, the pressure measured by the pressure sensor 190 should increase. The pressure should increase because fuel vapor flow through the outlet 154 and port 162 is blocked (via the closed purge valve 106) and fuel vapor flow through the outlet 150 is also blocked because the port 158 is closed. However, if the purge valve 106 is detached from the intake system 54, the pressure may not increase or may increase less than expected. This may be due to fuel vapor flowing through the outlet 150.

After generating the first trigger signal 228, the triggering module 224 generates a third trigger signal 236. The triggering module 224 may generate the third trigger signal 236, for example, a second predetermined period after generating the first trigger signal 228. The triggering module 224 may generate the third trigger signal 236 before or after generating the second trigger signal 232 (i.e., before or after the pump 110 is turned on). In response to the generation of the third trigger signal 236, a first pressure module 240 stores the pressure sample 212 and outputs the stored pressure sample as a first pressure 244.

The triggering module 224 generates a fourth trigger signal 248 after generating the third trigger signal 236. The triggering module 224 may generate the fourth trigger signal 248, for example, a third predetermined period after generating the third trigger signal 236. In response to the generation of the fourth trigger signal 248, a second pressure module 252 stores the pressure sample 212 and outputs the stored pressure sample as a second pressure 256. When the purge valve 106 is attached to the intake system 54, the second pressure 256 should be greater than the first pressure 244 since flow through the purge valve 106 and into the intake system 54 is blocked.

A difference module 260 may be implemented to determine a pressure difference 264 between the second pressure 256 and the first pressure 244. For example, the difference module 260 may set the pressure difference 264 based on or equal to the second pressure 256 minus the first pressure 244.

A diagnostic module 268 determines whether the purge valve 106 is detached from the component 166 of the intake system 54. Detachment of the purge valve 106 from the intake system 54 includes leaks between the purge valve 106 and the intake system 54 (e.g., one or more leaks in a valve seat between the purge valve 106 and the intake system 54). For example, the diagnostic module 268 may diagnose that the purge valve 106 is detached from the component 166 of the intake system 54 when the pressure difference 264 is less than a predetermined pressure. The predetermined pressure may be calibrated and is greater than zero. The diagnostic module 268 may diagnose that the purge valve 106 is attached to the component 166 of the intake system 54 when the pressure difference 164 is greater than the predetermined pressure. In various implementations, the diagnostic module 268 may determine whether the purge valve 106 is detached based on a comparison of the second pressure 256 with the first pressure 244.

When the purge valve 106 is detached from the component 166 of the intake system 54, the diagnostic module 268 stores a predetermined diagnostic trouble code (DTC) 272 in memory 276. The predetermined DTC indicates that the purge valve 106 is detached from the component 166 of the intake system 54. A monitoring module 278 monitors the memory 276 and illuminates a malfunction indicator lamp (MIL) 280 when the purge valve 106 is detached from the component 166 of the intake system 54.

The MIL 280 may, for example, indicate that it may be appropriate to seek servicing for the vehicle. Upon servicing the vehicle, a vehicle service technician may access the memory 276. The predetermined DTC may serve to indicate to the vehicle service technician that the purge valve 106 is detached from the intake system 54. One or more other remedial actions may also be taken when the purge valve 106 is detached from the intake system 54. As one example, the pump 110 may be disabled. Additionally, the purge valve 106 may be opened and the switching valve 112 may be actuated to the vent position (or the vent valve 150 may be opened) to equalize the pressure across the vapor canister 104.

Figure 6:
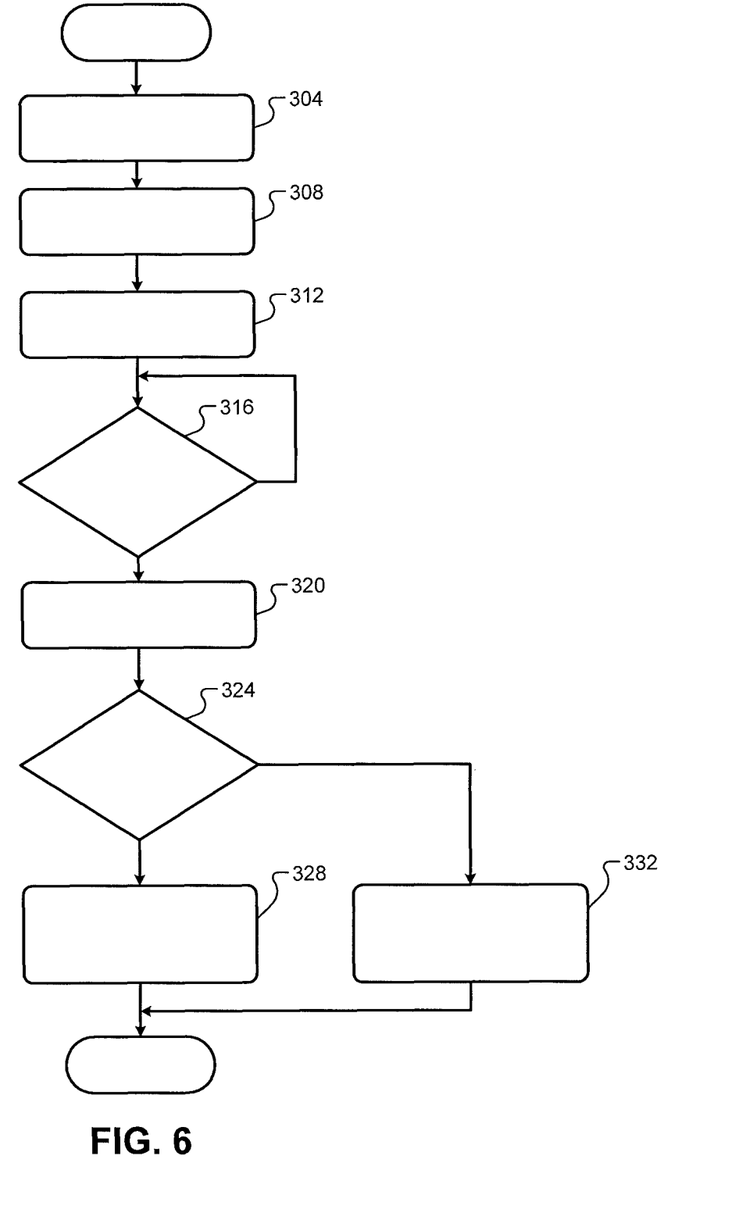
FIGS. 6 and 7 are flowcharts depicting example methods of diagnosing attachment and detachment of a purge valve to and from an air intake system.
Figure 7:
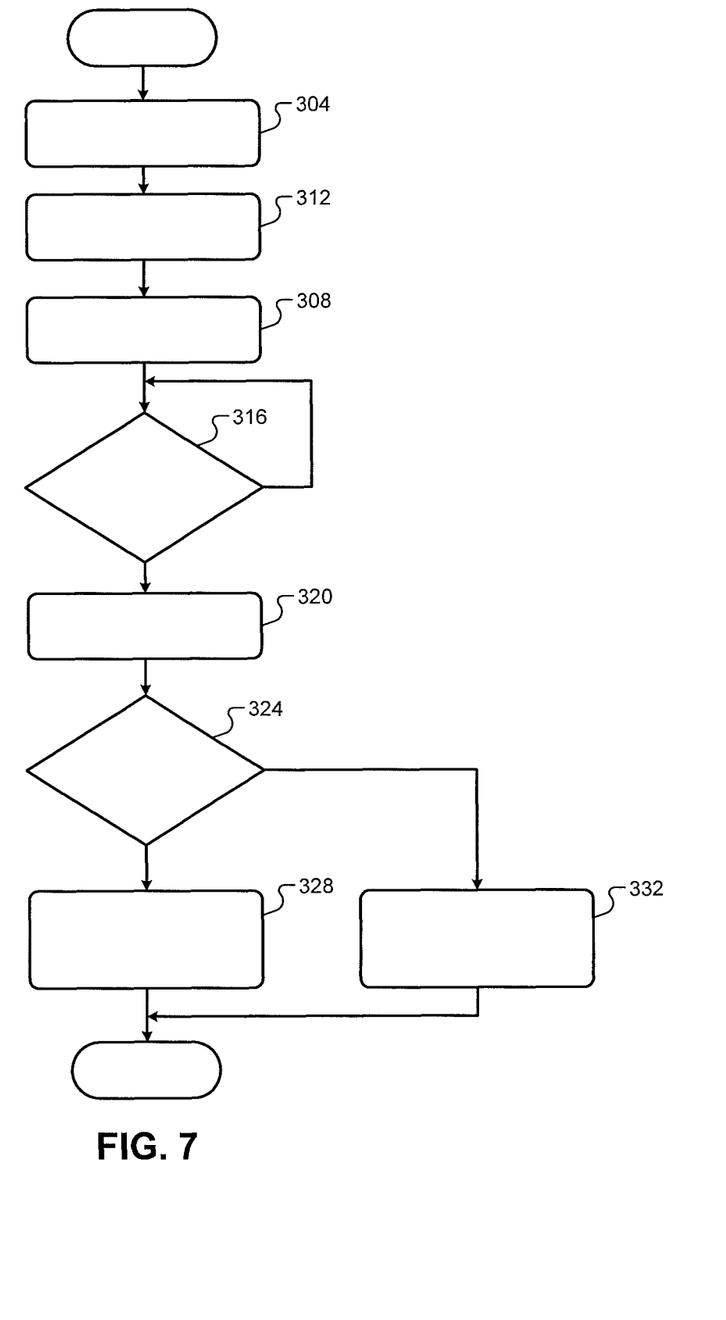

Referring now to FIG. 6, a flowchart depicting an example method of diagnosing whether the purge valve 106 is detached from the component 166 of the intake system 54 is presented. At 304, the purge valve control module 216 closes the purge valve 106 to prevent flow through the purge valve 106 and into the intake system 54. At 308, the pump control module 220 may turn on the pump 110. At 312, the first pressure module 240 stores the pressure sample 212 at that time as the first pressure 244. As shown in FIG. 7, the first pressure 244 may be obtained at 312 before the pump 110 is turned on at 308.

At 316, the triggering module 224 may determine whether a predetermined period has passed (since turning on the pump 110 or obtaining the first pressure 244). If 316 is true, control continues with 320. If 316 is false, control may remain at 316. The second pressure module 252 stores the pressure sample 212 at that time as the second pressure 256.

The diagnostic module 268 may determine whether the second pressure 256 is greater than the first pressure 244 at 324. For example, the diagnostic module 268 may determine whether the pressure difference 264 is greater than the predetermined pressure at 324. The difference module 260 may set the pressure difference 264 based on or equal to the second pressure 256 minus the first pressure 244. If 324 is false, the diagnostic module 268 indicates that the purge valve 106 is detached from the component 166 of the intake system 54 at 328. If 324 is true, the diagnostic module 268 indicates that the purge valve 106 is still attached to the component of the intake system 54 at 332.

When the purge valve 106 is detached from the component 166 of the intake system 54, the diagnostic module 268 stores the predetermined DTC in the memory 276. The monitoring module 278 illuminates the MIL 280 when the predetermined DTC is stored. One or more other remedial actions may also be taken when the purge valve 106 is detached from the component 166 of the intake system 54. For example, the pump 110 may be disabled and/or one or more other suitable remedial actions may be taken when the purge valve 106 is detached from the component 166 of the intake system 54.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A diagnostic system for a vehicle, comprising:
a purge valve control module that closes a purge valve that regulates fuel vapor flow from a fuel vapor canister to an intake system of an engine;
a pump control module that, after the closing of the purge valve, turns on a pump that pumps fuel vapor toward the purge valve;
a first pressure module that, after the purge valve is closed, determines a first pressure measured using a pressure sensor located between the pump and the purge valve;
a second pressure module that, after the determination of the first pressure and while the pump is on, determines a second pressure measured using the pressure sensor located between the pump and the purge valve; and
a diagnostic module that selectively diagnoses detachment of the purge valve from the intake system based on the first and second pressures.

2. The diagnostic system of claim 1 further comprising a difference module that determines a pressure difference based on the second pressure minus the first pressure,
wherein the diagnostic module diagnoses the detachment of the purge valve when the pressure difference is less than a predetermined pressure.

3. The diagnostic system of claim 2 wherein the diagnostic module diagnoses attachment of the purge valve with the intake system when the pressure difference is greater than the predetermined pressure.

4. A system comprising:
the diagnostic system of claim 1; and
the purge valve, wherein the purge valve includes:
an input port that for receiving output from the pump; and
two output ports for sealingly engaging two input ports of the intake system, respectively.

5. The system of claim 4 wherein one of the two input ports of the intake system is closed to prevent flow from the purge valve into the intake system through the one of the two input ports.

6. The diagnostic system of claim 1 wherein the diagnostic module sets a predetermined diagnostic trouble code (DTC) in memory when the purge valve is detached from the intake system.

7. The diagnostic system of claim 1 further comprising a monitoring module that selectively illuminates a malfunction indicator lamp when the purge valve is detached from the intake system.

8. The diagnostic system of claim 1 wherein the second pressure module determines the second pressure a predetermined period after the determination of the first pressure.

9. The diagnostic system of claim 1 wherein the second pressure module determines the second pressure a predetermined period after the turning on of the pump.

10. The diagnostic system of claim 1 wherein the first pressure module determines the first pressure one of before and after the turning on of the pump.

11. A method comprising:
closing a purge valve that regulates fuel vapor flow from a fuel vapor canister to an intake system of an engine;
after the closing of the purge valve, turning on a pump that pumps fuel vapor toward the purge valve;
after the purge valve is closed, determining a first pressure measured using a pressure sensor located between the pump and the purge valve;
after the determination of the first pressure and while the pump is on, determining a second pressure measured using the pressure sensor located between the pump and the purge valve; and
selectively diagnosing detachment of the purge valve from the intake system based on the first and second pressures.

12. The method of claim 11 further comprising:
determining a pressure difference based on the second pressure minus the first pressure; and
diagnosing the detachment of the purge valve when the pressure difference is less than a predetermined pressure.

13. The method of claim 12 further comprising diagnosing attachment of the purge valve with the intake system when the pressure difference is greater than the predetermined pressure.

14. The method of claim 11 wherein the purge valve includes:
an input port that for receiving output from the pump; and
two output ports for sealingly engaging two input ports of the intake system, respectively.

15. The method of claim 14 wherein one of the two input ports of the intake system is closed to prevent flow from the purge valve into the intake system through the one of the two input ports.

16. The method of claim 11 further comprising setting a predetermined diagnostic trouble code (DTC) in memory when the purge valve is detached from the intake system.

17. The method of claim 11 further comprising selectively illuminating a malfunction indicator lamp when the purge valve is detached from the intake system.

18. The method of claim 11 further comprising determining the second pressure a predetermined period after the determination of the first pressure.

19. The method of claim 11 further comprising determining the second pressure a predetermined period after the turning on of the pump.

20. The method of claim 11 further comprising determining the first pressure one of before and after the turning on of the pump.

* * * * *